United States Patent
Hsu et al.

(10) Patent No.: US 9,866,106 B2
(45) Date of Patent: Jan. 9, 2018

(54) POWER SUPPLY APPARATUS WITH EXTENDING HOLD UP TIME FUNCTION

(71) Applicant: DELTA ELECTRONICS, INC., Taoyuan County (TW)

(72) Inventors: Cheng-Chan Hsu, Taoyuan County (TW); Yi-Sheng Chang, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 234 days.

(21) Appl. No.: 15/013,237

(22) Filed: Feb. 2, 2016

(65) Prior Publication Data

US 2016/0359359 A1 Dec. 8, 2016

(30) Foreign Application Priority Data

Jun. 5, 2015 (TW) .............................. 104118232 A

(51) Int. Cl.
| | |
|---|---|
| *H02M 1/32* | (2007.01) |
| *G06F 1/30* | (2006.01) |
| *G06F 1/26* | (2006.01) |
| *H02M 3/155* | (2006.01) |
| *H02M 3/22* | (2006.01) |
| *H02M 1/00* | (2006.01) |

(52) U.S. Cl.
CPC .............. *H02M 1/32* (2013.01); *G06F 1/263* (2013.01); *G06F 1/30* (2013.01); *H02M 3/155* (2013.01); *H02M 3/22* (2013.01); *H02M 2001/0096* (2013.01)

(58) Field of Classification Search
CPC .. H02M 3/22; H02M 3/155; H02M 2001/096; G05F 1/652; G05F 1/656; G06F 1/30; G06F 1/263
See application file for complete search history.

(56) References Cited

U.S. PATENT DOCUMENTS 7,061,212 B2 * 6/2006 Phadke ............... H02M 1/4225
323/222

* cited by examiner

*Primary Examiner* — Robert Deberadinis
(74) *Attorney, Agent, or Firm* — Hauptman Ham, LLP

(57) ABSTRACT

A power supply apparatus includes a bulk capacitor, a voltage dropper unit and a pre-charging capacitor. The voltage dropper unit is electrically connected to the bulk capacitor. The pre-charging capacitor is electrically connected to the voltage dropper unit. When the power supply apparatus receives an input direct current voltage, a voltage of the bulk capacitor is provided with a first voltage, and the pre-charging capacitor is charged so that the pre-charging capacitor is provided with a second voltage, and the second voltage is greater than the first voltage. When the voltage of the bulk capacitor is less than a predetermined voltage, the second voltage of the pre-charging capacitor is converted voltage by the voltage dropper unit to provide for extending a hold up time of the power supply apparatus.

11 Claims, 5 Drawing Sheets

POWER SUPPLY APPARATUS WITH EXTENDING HOLD UP TIME FUNCTION

BACKGROUND OF THE INVENTION

Field of the Invention

The present invention relates to a power supply apparatus, and especially relates to a power supply apparatus with an extending hold up time function.

Description of the Related Art

The power supply apparatus is a very common electronic apparatus. The power supply apparatus is used to supply power to the load apparatus to drive the load apparatus. Therefore, the power supply apparatus is very important. Usually, the power supply apparatus is connected to the alternating current power supply apparatus to receive the alternating current power.

The design of the hold up time of the related art power supply apparatus is based on the capacitor energy-storage formula: $(\frac{1}{2})C(V2^2-V1^2)=PT$, wherein the C means the bulk capacitor, the V2 means the operating voltage, the V1 means the cut-off voltage, the P means the output power of the power supply apparatus, and the T means the hold up time. According to the formula mentioned above, in order to extend the hold up time, the designer usually increases the bulk capacitor. However, the design of the modern power supply apparatus is slimmer and lighter today. The bulk capacitor has a larger volume, so that increasing the bulk capacitor is not practical. This problem needs to be resolved.

SUMMARY OF THE INVENTION

In order to solve the above-mentioned problems, an object of the present invention is to provide a power supply apparatus with an extending hold up time function.

In order to achieve the object of the present invention mentioned above, the power supply apparatus of the present invention has a hold up time. The power supply apparatus includes a bulk capacitor, a pre-charging capacitor and a voltage dropper unit. The voltage dropper unit is electrically connected between the bulk capacitor and the pre-charging capacitor. When the power supply apparatus receives an input direct current voltage, a voltage of the bulk capacitor is provided with a first voltage, and the pre-charging capacitor is charged so that the pre-charging capacitor is provided with a second voltage, and the second voltage is greater than the first voltage. When the voltage of the bulk capacitor is less than a predetermined voltage, the voltage of the pre-charging capacitor is converted voltage by the voltage dropper unit to supply to the bulk capacitor to extend the hold up time. Namely, when the voltage of the bulk capacitor is less than the predetermined voltage, the voltage of the pre-charging capacitor is reduced voltage by the voltage dropper unit to obtain a reduced-voltage and then the reduced-voltage is supplied to the bulk capacitor to extend the hold up time.

The advantage of the present invention is to extend the hold up time of the power supply apparatus.

DETAILED DESCRIPTION OF THE INVENTION

Please refer to following detailed description and figures for the technical content of the present invention. The following detailed description and figures are referred for the present invention, but the present invention is not limited to it.

Figure 1:
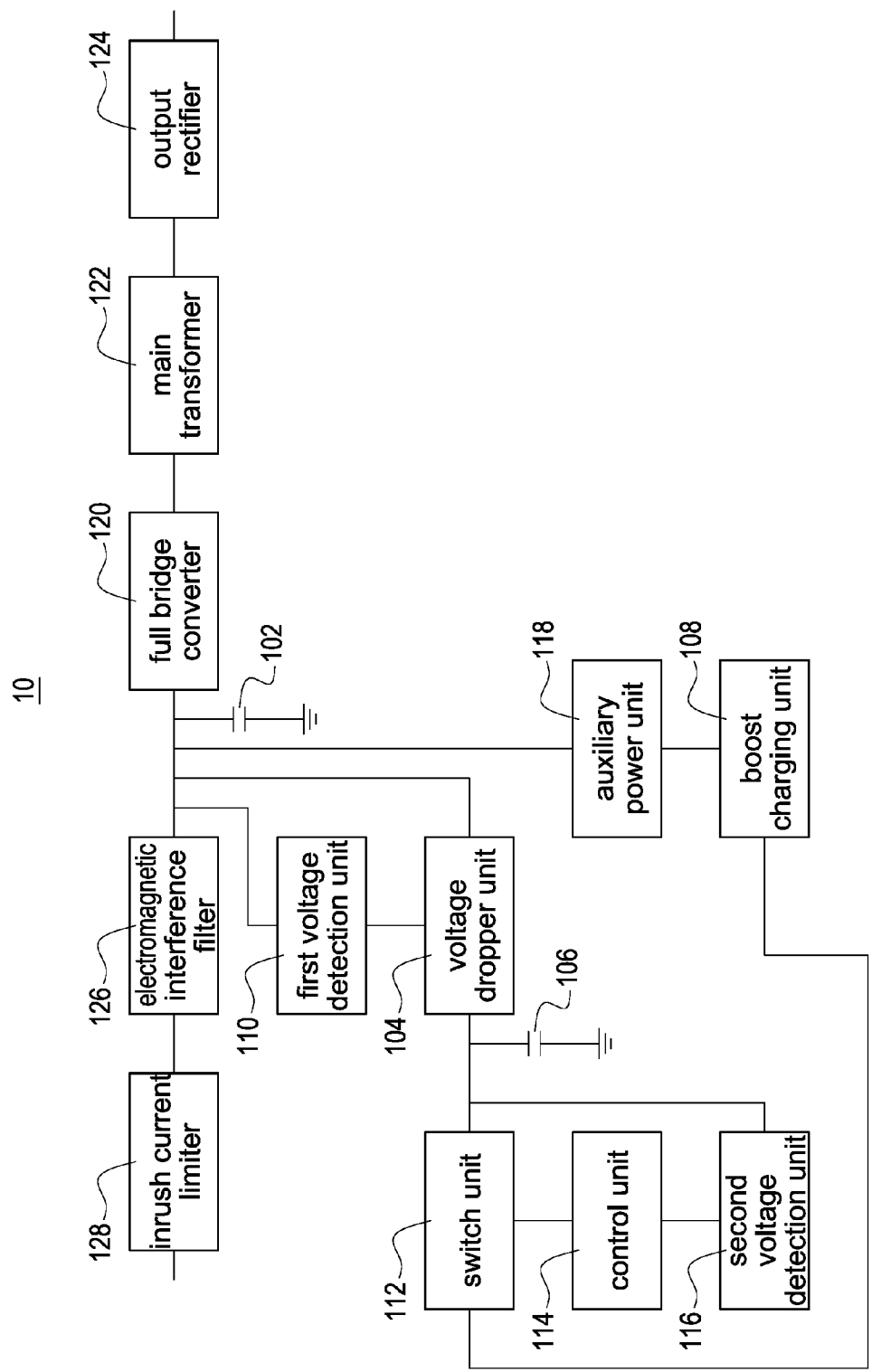
FIG. 1 shows a block diagram of the first embodiment of the power supply apparatus of the present invention.
Figure 2:
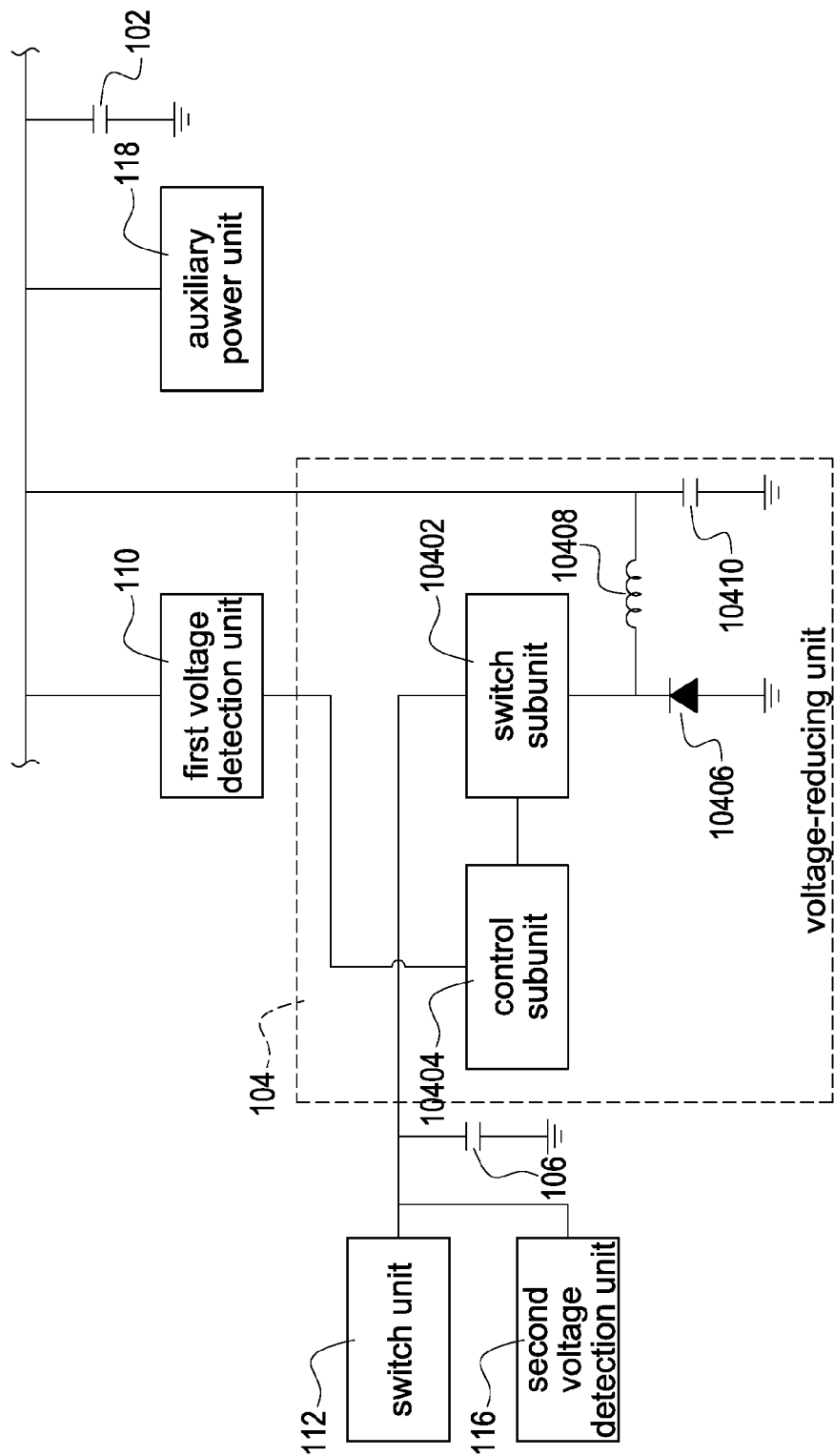
FIG. 2 shows a block diagram of the voltage dropper unit of the present invention.
Figure 3:
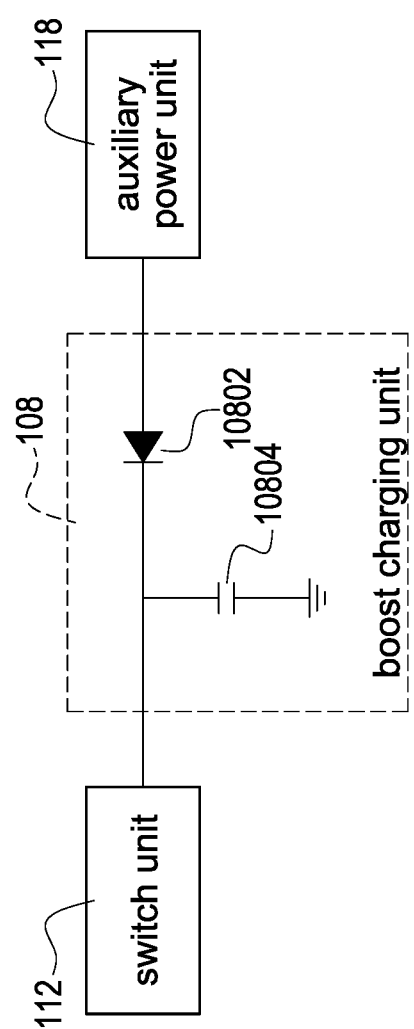
FIG. 3 shows a block diagram of the boost charging unit of the present invention.

FIG. 1 shows a block diagram of the first embodiment of the power supply apparatus of the present invention. FIG. 2 shows a block diagram of the voltage dropper unit of the present invention. FIG. 3 shows a block diagram of the boost charging unit of the present invention.

In FIG. 1, a power supply apparatus 10 has a hold up time and comprises a bulk capacitor 102, a pre-charging capacitor 106 and a voltage dropper unit 104. The voltage dropper unit 104 is electrically connected between the bulk capacitor 102 and the pre-charging capacitor 106.

In this embodiment, when the power supply apparatus 10 receives an input direct current voltage, the bulk capacitor 102 is charged with the input direct current voltage, so that a voltage of the bulk capacitor 102 is provided with a first voltage. The pre-charging capacitor 106 is charged so that the pre-charging capacitor 106 is provided with a second voltage. The second voltage is greater than the first voltage. It is noted that the voltage of the buck capacitor 102 may be decreased because of power failure of the input direct current voltage or other power failure situation (such as power drop out). When the voltage of the bulk capacitor 102 is less than a predetermined voltage, the voltage of the pre-charging capacitor 106 is converted by the voltage dropper unit 104 and then the converted voltage is supplied to the bulk capacitor 102 to extend the hold up time. Namely, when the voltage of the bulk capacitor 102 is less than the predetermined voltage, the voltage of the pre-charging capacitor 106 is converted by the voltage dropper unit 104 to obtain a reduced-voltage and then the reduced-voltage is supplied to the bulk capacitor 102 to extend the hold up time.

Please refer to FIG. 1 again. The power supply apparatus 10 further comprises a boost charging unit 108, a first voltage detection unit 110, a switch unit 112, a control unit 114, a second voltage detection unit 116, an auxiliary power unit 118, a full bridge converter 120, a main transformer 122, an output rectifier 124, an electromagnetic interference filter 126 and an inrush current limiter 128.

When the input direct current voltage is not enough or is dropped out, the voltage of the bulk capacitor 102 is decreased from the first voltage slowly. When the voltage of the bulk capacitor 102 is less than the predetermined voltage, the voltage dropper unit 104 may convert the second voltage of the pre-charging capacitor 106 into the reduced-voltage and then the reduced-voltage is supplied to the bulk capacitor 102. In an embodiment, the reduced-voltage is equal to the predetermined voltage.

Please refer to FIG. 2 and FIG. 3. The voltage dropper unit 104 comprises a switch subunit 10402, a control subunit 10404, a first diode 10406, a first inductor 10408 and a first capacitor 10410. The boost charging unit 108 comprises a second diode 10802 and a second capacitor 10804.

The voltage dropper unit 104 is electrically connected to the bulk capacitor 102. The pre-charging capacitor 106 is electrically connected to the voltage dropper unit 104. The boost charging unit 108 is electrically connected to the voltage dropper unit 104 and the pre-charging capacitor 106. The first voltage detection unit 110 is electrically connected to the bulk capacitor 102 and the voltage dropper unit 104. The switch unit 112 is electrically connected to the voltage dropper unit 104, the pre-charging capacitor 106 and the boost charging unit 108. The control unit 114 is electrically connected to the switch unit 112. The control unit 114 obtains the voltage of the pre-charging capacitor 106 through the second voltage detection unit 116, and turns on or turns off the switch unit 112 according to the voltage of the pre-charging capacitor 106. The second voltage detection unit 116 is electrically connected to the voltage dropper unit 104, the pre-charging capacitor 106, the switch unit 112 and the control unit 114. The auxiliary power unit 118 is electrically connected to the bulk capacitor 102, the voltage dropper unit 104, the first voltage detection unit 110 and the boost charging unit 108. The auxiliary power unit 118 provides the boost charging unit 108 with an electric power for charging the pre-charging capacitor 106. The full bridge converter 120 is electrically connected to the bulk capacitor 102, the voltage dropper unit 104, the first voltage detection unit 110 and the auxiliary power unit 118. The main transformer 122 is electrically connected to the full bridge converter 120. The output rectifier 124 is electrically connected to the main transformer 122. The electromagnetic interference filter 126 is electrically connected to the bulk capacitor 102, the voltage dropper unit 104, the first voltage detection unit 110, the auxiliary power unit 118 and the full bridge converter 120. The inrush current limiter 128 is electrically connected to the electromagnetic interference filter 126.

The switch subunit 10402 is electrically connected to the pre-charging capacitor 106, the switch unit 112 and the second voltage detection unit 116. The control subunit 10404 is electrically connected to the switch subunit 10402 and the first voltage detection unit 110. The first diode 10406 is electrically connected to the switch subunit 10402. The first inductor 10408 is electrically connected to the switch subunit 10402, the first diode 10406 and the bulk capacitor 102. The first capacitor 10410 is electrically connected to the first inductor 10408 and the bulk capacitor 102. The second diode 10802 is electrically connected to the switch unit 112 and the auxiliary power unit 118. The second capacitor 10804 is electrically connected between the switch unit 112, the second diode 10802 and a ground terminal.

When the power supply apparatus 10 receives the input direct current voltage (for example, 40 volts sent through the inrush current limiter 128), the bulk capacitor 102 is charged with the input direct current voltage, so that the voltage of the bulk capacitor 102 is provided with the first voltage (for example, 40 volts), and the pre-charging capacitor 106 is charged so that the pre-charging capacitor 106 is provided with the second voltage (for example, 80 volts), and the second voltage is greater than the first voltage. When the voltage of the bulk capacitor 102 is less than the predetermined voltage (for example, 36 volts) (namely, the power supply apparatus 10 stops receiving the input direct current voltage), the voltage dropper unit 104 converts the second voltage of the pre-charging capacitor 106 into a reduced-voltage (for example, 36 volts) and then the reduced-voltage is supplied for extending the hold up time of the power supply apparatus 10.

Comparing to the prior art power supply apparatus, besides the bulk capacitor 102, the pre-charging capacitor 106 which is parallel to the bulk capacitor 102 is arranged in the power supply apparatus 10 of the present invention. The pre-charging capacitor 106 is charged firstly and the voltage of the pre-charging capacitor 106 is greater than the voltage of the bulk capacitor 102. When the input direct current voltage is not enough or is dropped out, the electric energy stored in the bulk capacitor 102 is supplied to the back-end circuit firstly. When the electric energy stored in the bulk capacitor 102 is decreased gradually so that the voltage of the bulk capacitor 102 is less than the predetermined voltage, the electric energy pre-charging to and stored in the pre-charging capacitor 106 is supplied to the back-end circuit to extend the hold up time. As mentioned in the prior art, if longer hold up time is required, the volume of the bulk capacitor has to be increased to store greater electric energy. In order to overcome this problem, the pre-charging capacitor 106 of the present invention is firstly charged to a greater voltage to store greater electric energy. Therefore, the electric energy stored is greater and the volume of the bulk capacitor 102 is minimized.

When the power supply apparatus 10 receives the input direct current voltage, the pre-charging capacitor 106 is charged by the boost charging unit 108, so that the voltage of the pre-charging capacitor 106 is the second voltage.

The first voltage detection unit 110 detects the voltage of the bulk capacitor 102 and sends the information of the detected voltage to the voltage dropper unit 104. When the voltage of the bulk capacitor 102 is less than the predetermined voltage, the voltage dropper unit 104 converts the second voltage of the pre-charging capacitor 106 into a reduced-voltage and then the reduced-voltage is supplied for extending the hold up time of the power supply apparatus 10.

The second voltage detection unit 116 detects the voltage of the pre-charging capacitor 106 and informs the control unit 114 of the voltage of the pre-charging capacitor 106. When receiving the input direct current voltage and the voltage of the pre-charging capacitor 106 is less than the second voltage (namely, the pre-charging capacitor 106 is not fully charged yet), the control unit 114 turns on the switch unit 112, so that the pre-charging capacitor 106 is charged by the boost charging unit 108. When receiving the input direct current voltage and the voltage of the pre-charging capacitor 106 is greater than or equal to the second voltage (namely, the pre-charging capacitor 106 is fully charged), the control unit 114 turns off the switch unit 112, so that the boost charging unit 108 stops charging the pre-charging capacitor 106.

The first voltage detection unit 110 detects the voltage of the bulk capacitor 102 and informs the control subunit 10404 of the voltage of the bulk capacitor 102. When the voltage of the bulk capacitor 102 is less than the predetermined voltage, the control subunit 10404 turns on the switch subunit 10402, so that the voltage dropper unit 104 starts to convert the second voltage of the pre-charging capacitor 106 into the reduced voltage and then the reduced voltage is supplied for extending the hold up time of the power supply apparatus 10.

The auxiliary power unit 118 sends an auxiliary power to the boost charging unit 108. When the control unit 114 turns on the switch unit 112, the boost charging unit 108 boosts the auxiliary power to charge the pre-charging capacitor 106. Moreover, the input direct current voltage could be converted into the auxiliary power.

Figure 4:
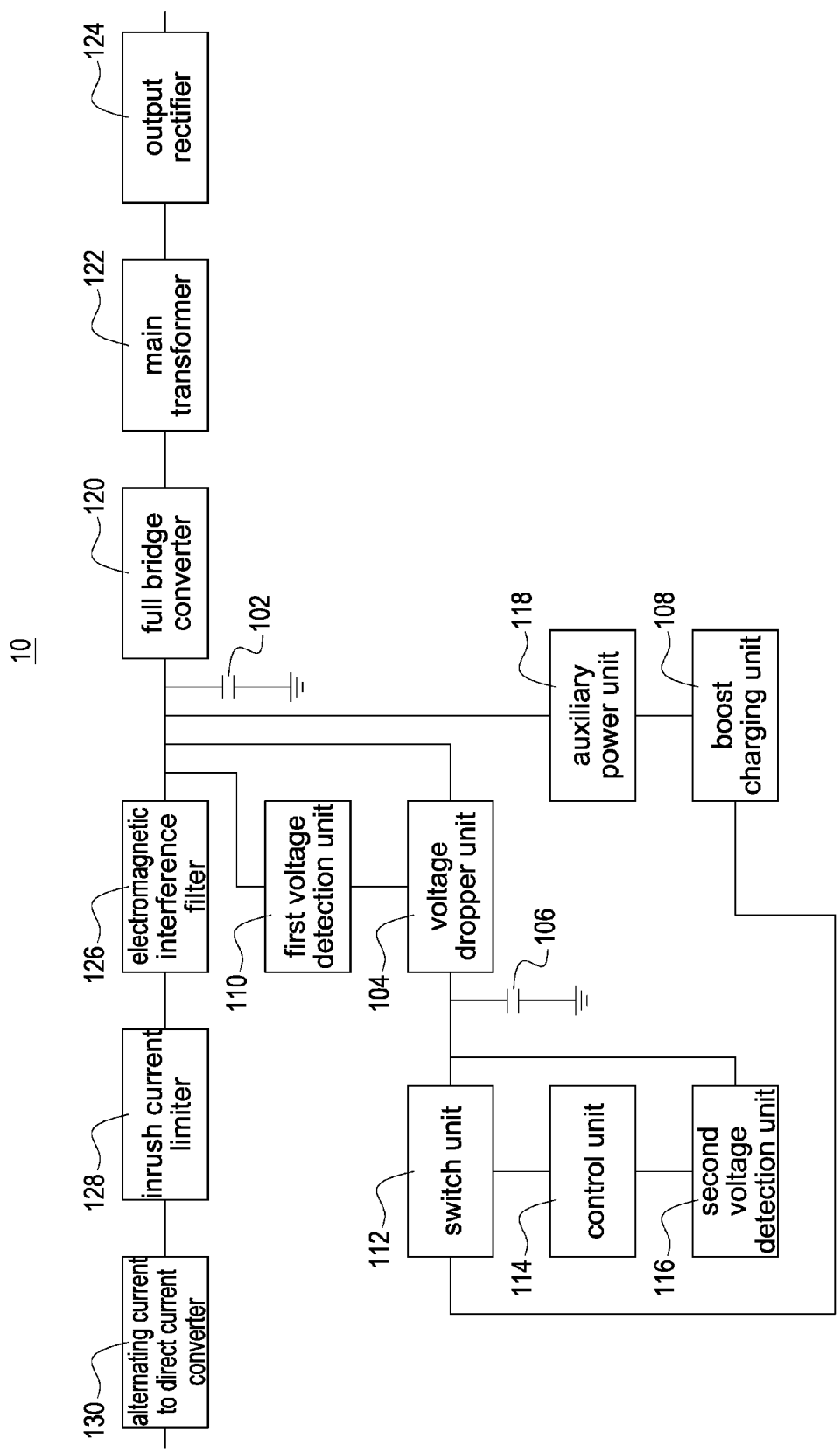
FIG. 4 shows a block diagram of the second embodiment of the power supply apparatus of the present invention.

FIG. 4 shows a block diagram of the second embodiment of the power supply apparatus of the present invention. The description for the elements shown in FIG. 4, which are similar to those shown in FIGS. 1-3, is not repeated here for brevity. Moreover, the power supply apparatus 10 further comprises an alternating current to direct current converter 130 electrically connected to the inrush current limiter 128. The alternating current to direct current converter 130 converts an input alternating current voltage into the input direct current voltage.

Figure 5:
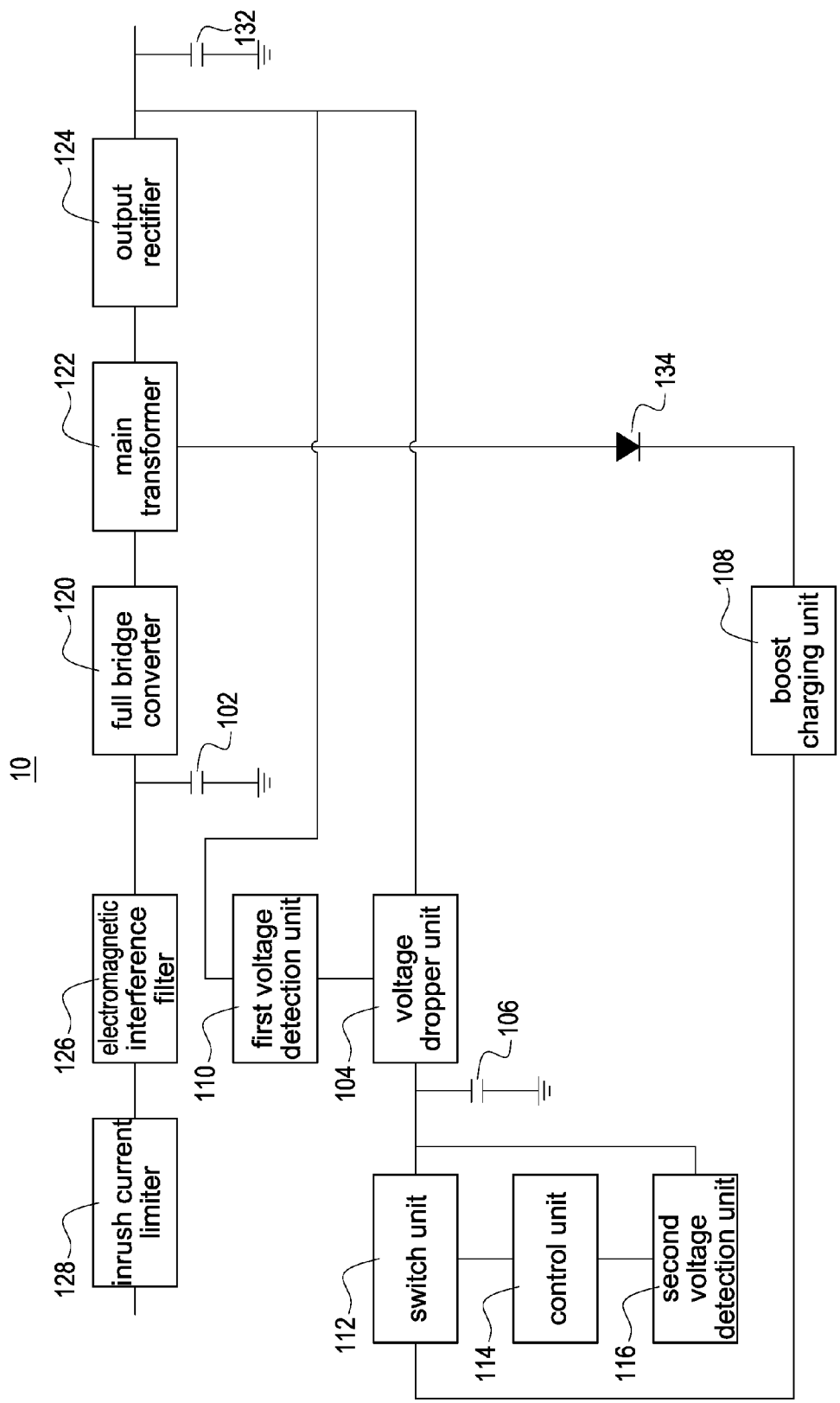
FIG. 5 shows a block diagram of the third embodiment of the power supply apparatus of the present invention.

FIG. 5 shows a block diagram of the third embodiment of the power supply apparatus of the present invention. The description for the elements shown in FIG. 5, which are similar to those shown in FIGS. 1~3, is not repeated here for brevity. Moreover, the power supply apparatus 10 further comprises an output side capacitor 132 and a third diode 134. The output side capacitor 132 is electrically connected to the output rectifier 124. The third diode 134 is electrically connected to the main transformer 122 and the boost charging unit 108.

When the power supply apparatus 10 receives the input direct current voltage (for example, 40 volts sent through the inrush current limiter 128), a voltage of the output side capacitor 132 is a first voltage (for example, 12 volts), and the pre-charging capacitor 106 is charged so that the pre-charging capacitor 106 is provided with a second voltage (for example, 24 volts), and the second voltage is greater than the first voltage. When the voltage of the output side capacitor 132 is less than a predetermined voltage (for example, 10 volts) (namely, the power supply apparatus 10 stops receiving the input direct current voltage), the voltage dropper unit 104 converts the second voltage of the pre-charging capacitor 106 into a reduced voltage and then the reduced voltage is supplied for extending a hold up time of the power supply apparatus 10.

When the power supply apparatus 10 receives the input direct current voltage, the pre-charging capacitor 106 is charged by the boost charging unit 108, so that the voltage of the pre-charging capacitor 106 is provided with the second voltage.

The first voltage detection unit 110 detects the voltage of the output side capacitor 132 and informs the voltage dropper unit 104 of the voltage of the output side capacitor 132. When the voltage of the output side capacitor 132 is less than the predetermined voltage, the voltage dropper unit 104 converts the second voltage of the pre-charging capacitor 106 into the reduced voltage and then the reduced voltage is supplied for extending the hold up time of the power supply apparatus 10.

The second voltage detection unit 116 detects the voltage of the pre-charging capacitor 106 and informs the control unit 114 of the voltage of the pre-charging capacitor 106. When receiving the input direct current voltage and the voltage of the pre-charging capacitor 106 is less than the second voltage (namely, the pre-charging capacitor 106 is not fully charged yet), the control unit 114 turns on the switch unit 112, so that the pre-charging capacitor 106 is charged by the boost charging unit 108. When receiving the input direct current voltage and the voltage of the pre-charging capacitor 106 is greater than or equal to the second voltage (namely, the pre-charging capacitor 106 is fully charged), the control unit 114 turns off the switch unit 112, so that the pre-charging capacitor 106 is not charged by the boost charging unit 108.

The first voltage detection unit 110 detects the voltage of the output side capacitor 132 and informs the control subunit 10404 of the voltage of the output side capacitor 132. When the voltage of the output side capacitor 132 is less than the predetermined voltage, the control subunit 10404 turns on the switch subunit 10402, so that the second voltage of the pre-charging capacitor 106 is converted voltage by the voltage dropper unit 104 to supply for extending the hold up time of the power supply apparatus 10.

The main transformer 122 sends a conversion power through the third diode 134 to the boost charging unit 108. When the control unit 114 turns on the switch unit 112, the boost charging unit 108 boosts the conversion power to charge the pre-charging capacitor 106.

The advantage of the present invention is to extend the hold up time of the power supply apparatus.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus having a hold up time, the power supply apparatus comprising:
    a bulk capacitor;
    a pre-charging capacitor; and
    a voltage dropper unit electrically connected between the bulk capacitor and the pre-charging capacitor,
    wherein when the power supply apparatus receives an input direct current voltage, the bulk capacitor is provided with a first voltage, and the pre-charging capacitor is charged so that the pre-charging capacitor is provided with a second voltage, and the second voltage is greater than the first voltage;
    wherein when the voltage of the bulk capacitor is less than a predetermined voltage, the voltage of the pre-charging capacitor is converted by the voltage dropper unit to supply to the bulk capacitor for extending the hold up time.

2. The power supply apparatus in claim 1, wherein when the voltage of the bulk capacitor is less than the predetermined voltage, the voltage dropper unit converts the second voltage into the predetermined voltage to supply to the bulk capacitor.

3. The power supply apparatus in claim 1, further comprising:
    a first voltage detection unit electrically connected to the bulk capacitor,
    wherein the first voltage detection unit is configured to detect the voltage of the bulk capacitor.

4. The power supply apparatus in claim 1, further comprising:
    a boost charging unit electrically connected to the pre-charging capacitor,
    wherein when receiving the input voltage, the pre-charging capacitor is charged by the boost charging unit, so that the pre-charging capacitor is provided with the second voltage.

5. The power supply apparatus in claim 4, further comprising:
    a switch unit electrically connected between the pre-charging capacitor and the boost charging unit;
    a control unit electrically connected to the switch unit; and
    a second voltage detection unit electrically connected to the pre-charging capacitor and the control unit,
    wherein the control unit obtains the voltage of the pre-charging capacitor through the second voltage detection unit, and turns on or turns off the switch unit according to the voltage of the pre-charging capacitor.

6. The power supply apparatus in claim 5, wherein when receiving the input direct current voltage and when the voltage of the pre-charging capacitor is less than the second voltage, the control unit turns on the switch unit, so that the pre-charging capacitor is charged by the boost charging unit; when receiving the input direct current voltage and when the voltage of the pre-charging capacitor is greater than or equal to the second voltage, the control unit turns off the switch unit, so that the boost charging unit stops charging the pre-charging capacitor.

7. The power supply apparatus in claim 4, further comprising:
an auxiliary power unit electrically connected to the boost charging unit,
wherein the auxiliary power unit provides the boost charging unit with an electric power for charging the pre-charging capacitor.

8. The power supply apparatus in claim 7, wherein the boost charging unit comprises:
a diode electrically connected to the auxiliary power unit; and
a capacitor electrically connected between the diode and a ground terminal.

9. The power supply apparatus in claim 1, further comprising:
a full bridge converter electrically connected to the bulk capacitor and the voltage dropper unit.

10. The power supply apparatus in claim 9, further comprising:
a main transformer electrically connected to the full bridge converter; and
an output rectifier electrically connected to the main transformer.

11. The power supply apparatus in claim 9, further comprising:
an electromagnetic interference filter electrically connected to the bulk capacitor, the voltage dropper unit and the full bridge converter; and
an inrush current limiter electrically connected to the electromagnetic interference filter.

* * * * *